Patented Dec. 5, 1950

2,532,278

UNITED STATES PATENT OFFICE 2,532,278

PRODUCTION OF HYDANTOIN FORMALDEHYDE RESINS

Albert F. Chadwick, Westfield, N. J., assignor to E. I. du Pont de Nemours & Company, Wilmington, Del., a corporation of Delaware No Drawing. Application April 24, 1948, Serial No. 23,148

6 Claims. (Cl. 260—67.5)

1

This invention relates to the production of resins, and more particularly it relates to an improved process for the production of hydantoin-formaldehyde resins. Hydantoin-formaldehyde resins have been found generally useful as textile sizes, paper finishes, and adhesives.

Hydantoin-formaldehyde resins have been produced heretofore by the process described and claimed in Jacobson United States Patent No. 2,155,863. In accordance with the process described in the Jacobson patent, a hydantoin is caused to react with formaldehyde in the proportion of at least 2 moles formaldehyde per mole of hydantoin, in the presence of an alkali metal hydroxide, the reaction mixture being refluxed for a period of one to three hours, after which the solution is acidified with an acid such as acetic acid, and the excess formaldehyde and water evaporated off.

It is an object of this invention to provide a new and improved process for the production of hydantoin-formaldehyde resins.

It is another object of this invention to provide an improved process for the production of hydantoin-formaldehyde resins whereby greater yields may be obtained.

It is a further object of this invention to provide an improved process for the production of hydantoin-formaldehyde resins whereby resins of higher melting point may be obtained.

It is still another object of this invention to provide an improved process for the production of hydantoin-formaldehyde resins whereby such resins can be more quickly produced by a single procedural step.

Other objects of the invention will appear hereinafter.

The objects of this invention may be accomplished, in general, by bringing together formaldehyde and a hydantoin in the presence of a buffer salt taken from the group consisting of alkali metal salts of aliphatic mono- and di-carboxylic acids containing not to exceed 5 carbon atoms, alkali metal salts of boric acid and alkali metal salts of phosphoric acid; said salt being present in sufficient amount that the initial pH is not less than 5. Although not essential it is preferred that an iron deactivator, for example, an alkali metal phosphate be present in the reaction mass.

2

As in the above-said Jacobson patent, the hydantoins which may be utilized in this invention may be represented by the general formula:

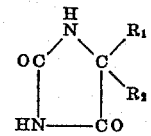

where $R_1$ and $R_2$ are hydrogen or monovalent aliphatic or cycloaliphatic groups such as methyl, ethyl, ethoxy ethyl, cyclohexyl, keto-cyclohexyl, etc. Alternatively, $R_1$ may be hydrogen and $R_2$ any of the aforementioned substituent groups, or $R_1$ and $R_2$ may together form a divalent aliphatic or cycloaliphatic group, as in the 5-disubstituted hydantoin derived from cyclohexanone, or cyclopentanone. However, it is generally preferred to use the 5,5-dialkyl hydantoins, e. g., 5,5-dimethyl hydantoin because this hydantoin is easily made by reacting acetone cyanhydrin with ammonium carbonate.

It will be understood that whenever reference is made to "hydantoin" or to "hydantoin-formaldehyde resin" throughout the specification and claims, unless otherwise noted, these terms will be taken to mean any of the hydantoins represented by the general formula given above, or their corresponding resins.

In practicing the process of the present invention it is preferred to use between 1.05 and 1.30 moles of formaldehyde per mole of hydantoin, although a greater excess of formaldehyde may be employed.

It has also been found that improved results, from a standpoint of higher resin melting point and increased molecular weight, can be obtained if, during the evaporation of water and excess formaldehyde, air is blown through the reaction mass. The air is preferably blown through the mass after the temperature of the liquid during evaporation has reached a temperature of at least 120° C. The blowing of air through the reaction mass facilitates the removal of water and excess formaldehyde and decreases resin decomposition by shortening the reaction time and lowering reaction temperature. The air used may be air taken at any atmospheric conditions. The air may be passed into the mass in any desired manner and in any amount less than that which will reduce the temperature of the mass below the softening point of the resin.

The formaldehyde used in carrying out the reaction of this invention may be in the form of an aqueous solution of formaldehyde, paraformaldehyde, anhydrous formaldehyde gas, or the like. If paraformaldehyde or anhydrous formaldehyde gas is used, a non-reactive solvent such as alcohol may be used, if desired, to facilitate the reaction. The more concentrated the formaldehyde is, the less evaporation of water will be necessary.

As above stated, the reaction between the hydantoin and the formaldehyde is carried out in the presence of a buffer salt taken from the group consisting of alkali metal salts of aliphatic mono- and di-carboxylic acids containing not to exceed 5 carbon atoms, alkali metal salts of boric acid and alkali metal salts of phosphoric acid. As examples of such salts the following may be named, sodium and potassium acetate, sodium and potassium propionate, sodium and potassium butyrate, sodium and potassium succinate, sodium tetraborate (borax), and trisodium phosphate. The buffer salt functions as a catalyst for the reaction. The rate of the reaction may be controlled to a considerable extent by varying the amount of the buffer salt used. This control of the reaction time is important for manufacturing purposes because too long a reaction time may decrease the yield of the product, for example, by sublimation of hydantoin (dimethyl hydantoin sublimes slowly at 140° C. to 150° C.), and too fast a reaction time makes the process difficult to handle on a large scale. It is, therefore, preferred that the buffer salt be used in a concentration of between 0.1% and 2.0%, based on the weight of the hydantoin. The quantity of the buffer salt will depend somewhat upon the particular buffer used. In any event, the buffer salt should be present in sufficient quantity that the initial pH value of mixture is at least 5. Moreover, the particular buffer salt used will determine to some extent the nature of the resulting resin, i. e., its melting point, molecular weight, etc. The following table shows how the rate of the reaction between formaldehyde and dimethyl hydantoin may be controlled by using different concentrations of sodium acetate as the buffer salt catalyst.

| Sodium Acetate Used (milli-equivalents of Na/mol of dimethylhydantoin) | pH of 10% Solution of Product | Time of Reaction at 140-150°C. to Prepare Resin Softening at 60-65° C. |
|---|---|---|
| 0.02 | 6.5 | 8 Hours. |
| 0.10 | 7.2 | 2 Hours. |
| 0.20 | 7.3 | 1½ Hours. |
| 0.77 | 7.4 | About 25 min. |
| 1.54 | 7.5 | About 20 min. |

In accordance with the best mode of carrying out the process of this invention, the hydantoin, formaldehyde, and catalyst are brought together in the proportion of about 1 mole of the hydantoin to 1.05 to 1.30 moles formaldehyde and 0.1% to 2.0% of the catalyst, based on the weight of hydantoin. The mixture is then heated to evaporate water and excess formaldehyde until the temperature reaches 120° C. to 140° C. Air is then passed through the mixture at a temperature of 120° C. to 160° C. until resin of the desired softening point is obtained. In the case of the production of a high melting resin it is sometimes necessary to raise the temperature to 170° C. to 180° C. toward the end of the reaction period to keep the product fluid.

The following examples are given to illustrate several specific methods for carrying out the process of this invention. It is to be understood, of course, that the specific details set forth in these examples are illustrative and not limitative of the invention.

*Example I*

One hundred ten (110) moles of 5,5-dimethylhydantoin (14,080 grams) and 143 grams borax ($Na_2B_4O_7$—$10H_2O$) were added to 121 moles of formaldehyde (7,260 grams of 50% solution) in a fixe gallon Pfaudler kettle. The solution had an initial pH of 8.0. The resulting solution was heated to evaporate water and excess formaldehyde until the liquid temperature reached 134° C. To remove more volatile impurities, the solution was held at this temperature for three and one-half hours while air was being blown through it. The product was then discharged into shallow pans and allowed to cool. The resulting colorless, water-soluble resin weighed 15,400 grams and had an initial softening point of 95° C.

*Example II*

One hundred ten (110) moles of 5,5-dimethylhydantoin (14,080 grams) and 138 grams of sodium acetate trihydrate were added to 121 moles of formaldehyde (6,600 grams of 55% solution). The solution had an initial pH of 6.4. The resulting solution was processed as described in Example I except that the aeration step took only one and three-quarter hours. The water-soluble resin product weighed 15,900 grams and had an initial softening point of 73° C.

*Example III*

Two and two-tenths (2.2) moles of formaldehyde (144 grams of 46% solution) was added to a mixture of 256 grams (2 moles) 5,5-dimethylhydantoin and 5.1 grams of trisodium phosphate dodecahydrate in a 500 millimeter balloon flask. The solution had an initial pH of 7.9. The solution was heated to evaporate water and excess formaldehyde until the liquid temperature reached 148° C. Air was then passed through the mixture for six and one-quarter hours while the temperature was gradually raised to 165° C. A yield of 254 grams of water-soluble resin was obtained which had an initial softening point of 102° C.

*Example IV*

Two (2) moles of 5,5-dimethylhydantoin, 124 milliliters of 54.9% formaldehyde solution and 7.75 grams of borax were heated together in a 500 milliliter balloon flask until a clear solution formed. The solution had an initial pH of 8.0. The solution was heated to evaporate water and excess formaldehyde until the liquid temperature reached 140° C. Air was then blown through the solution for four hours during which time the temperature was gradually raised to 185° C. The product was a colorless, water-soluble resin which had an initial softening point of 120° C.

*Example V*

Two (2) moles of 5,5-dimethylhydantoin, 130 milliliters of 50% formaldehyde solution and 3.2 grams of sodium succinate were mixed and processed by the method described in Example IV. The solution had an initial pH of 8.4. The water-soluble resin obtained weighed 268 grams and had an initial softening point of 68° C.

Example VI

Two (2) moles (284 grams) of 5-methyl-5-ethylhydantoin was mixed with 7.8 grams of borax and 165 grams of 40% formaldehyde solution and the mixture processed as described in Example IV. The solution had an initial pH of 8.0. The resulting resin (297 grams) was slightly yellow and completely insoluble in water. It had an initial softening point of 112° C.

Example VII

Two (2) moles (256 grams) of 5,5-dimethylhydantoin was mixed with 130 milliliters (2.2 moles) of 46% formaldehyde solution and 4.0 grams of potassium acetate. The solution had an initial pH of 6.4. The mixture was evaporated until the liquid temperature reached 140° C. and then air was passed through the liquid for one and one-quarter hours. The resulting resin weighed 288 grams and had an initial softening point of 70° C.

Example VIII

Four (4) moles (512 grams) of 5,5-dimethylhydantoin, 139 grams of paraformaldehyde and 15.5 grams of borax ($Na_2B_4O_7$—$10H_2O$) were mixed in a one-liter, balloon flask and heated until the temperature of the melted mixture reached 140° C. Air was then passed through the mixture for three hours while the temperature was raised slowly to 174° C. The resulting water-soluble resin weighed 561 grams and had an initial softening point of 110° C.

Example IX

Eleven (11) moles of 5,5-dimethylhydantoin (14,080 grams), 69 grams of sodium acetate trihydrate, and 16 grams of monosodium phosphate monohydrate ($NaH_2PO_4.H_2O$) were added to 7,860 grams of 46.4% aqueous formaldehyde. The resulting solution, which had a pH of approximately 6.0, was heated to distill off water and excess formaldehyde until the temperature reached 134° C. Air was then passed through the reaction mixture at a temperature of 134–140° C. for 2.8 hours after which the resin was discharged into pans and allowed to cool. 15,680 grams of water-soluble resin was obtained which had an initial softening point of 73° C.

Example X

Four (4) moles (512 grams) of 5,5-dimethylhydantoin was dissolved in a mixture of 213 cc. of 54.9% formaldehyde solution and 80 cc. of normal sodium hydroxide. The solution had an initial pH of 8.0. Water and excess formaldehyde were evaporated from this solution until the pot temperature reached 137° C. After air had been passed through the mixture for two hours while the temperature was gradually raised to 160° C., a sample of the resin melted at 97° C. and was water-soluble. At this point, an exothermic reaction started which resulted in caramel formation and caused the resin to become dark brown and water-insoluble. This example shows that the use of sodium hydroxide as the catalyst is greatly inferior to the catalysts of this invention in view of the difficulty of controlling the reaction.

NOTE.—All the softening points recorded in the above examples were determined by heating a sealed capillary containing the resin in a Thiele melting point tube.

My study of the mechanism of the resin formation involved in this invention indicates that it most probably takes place in two reactions. First, formaldehyde and the hydantoin react to form a methylol hydantoin. This compound then condenses with itself with the elimination of water to yield the resin. While the first reaction takes place readily in aqueous solution in the pH range of 5–8 at temperatures of the order of 60° C. to 80° C., the condensation takes place at higher temperatures, chiefly after most of the water has been removed from the reaction mixture.

This process of this invention has the advantage of being exceedingly simple in that the two reactions are carried out in a single step by heating the reaction mixture to evaporate solvent and excess formaldehyde. In previously known methods for the production of hydantoin-formaldehyde resins it was necessary to first react the hydantoin and formaldehyde in the presence of an alkali metal hydroxide and then acidify the resulting reaction products, for example, by addition of acetic acid before the water and excess formaldehyde were evaporated from the mass.

Throughout the specification and claims, any reference to parts, proportions, and percentages, refers to parts, proportions, and percentages by weight unless otherwise specified.

Since it is obvious that many changes and modifications can be made in the above-described details without departing from the nature and spirit of the invention, it is to be understood that the invention is not to be limited to the above said details except as set forth in the appended claims.

What is claimed is:

1. A process for the production of hydantoin formaldehyde resins which comprises bringing together a hydantoin having the formula

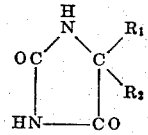

wherein $R_1$ and $R_2$ are taken from the class consisting of hydrogen, monovalent aliphatic, and cyclo aliphatic groups and formaldehyde in the presence of a buffer salt taken from the group consisting of alkali metal salts of unsubstituted aliphatic mono- and di-carboxylic acids containing not to exceed four carbon atoms, alkali metal salts of boric acid, and alkali metal salts of phosphoric acid, said salts being present in a sufficient amount that the initial pH of the reaction mixture is not less than 5.0, and heating said mass while blowing air therethrough until a resin of a higher softening point is obtained.

2. A process for the production of hydantoin-formaldehyde resins which comprises bringing together a hydantoin having the formula wherein $R_1$ and $R_2$ are taken from the class consisting of hydrogen, monovalent aliphatic, and cyclo aliphatic groups and formaldehyde in the presence of a buffer salt taken from the group consisting of alkali metal salts of unsubstituted aliphatic mono- and di-carboxylic acids containing not to exceed four carbon atoms, alkali metal salts of boric acid, and alkali metal salts of phosphoric acid, said salt being present in a sufficient amount that the initial pH of the reaction mixture is not less than 5.0, heating said mass to evaporate water therefrom until the temperature reaches between 120° C. and 140° C., and blowing air through said mass while maintaining the temperature between 120° C. and 180° C. until a resin of a higher softening point is obtained.

3. A process for the production of hydantoin-formaldehyde resins which comprises bringing together a hydantoin having the formula

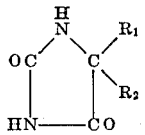

wherein $R_1$ and $R_2$ are taken from the class consisting of hydrogen, monovalent aliphatic, and cyclo aliphatic groups and formaldehyde in the proportion of 1.0 mole of hydantoin to 1.05–1.30 moles of formaldehyde in the presence of a buffer salt taken from the group consisting of alkali metal salts of unsubstituted aliphatic mono- and di-carboxylic acids containing not to exceed four carbon atoms, alkali metal salts of boric acid, and alkali metal salts of phosphoric acid, said salt being present in a sufficient amount that the initial pH of the reaction mixture is not less than 5.0, and heating said mass while blowing air therethrough until a resin of a higher softening point is obtained.

4. A process for the production of hydantoin-formaldehyde resins which comprises bringing together a hydantoin having the formula

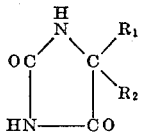

wherein $R_1$ and $R_2$ are taken from the class consisting of hydrogen, monovalent aliphatic, and cyclo aliphatic groups and formaldehyde in the proportion of 1.0 mole of hydantoin to 1.05–1.30 moles of formaldehyde in the presence of a buffer salt taken from the group consisting of alkali metal salts of unsubstituted aliphatic mono- and di-carboxylic acids containing not to exceed four carbon atoms, alkali metal salts of boric acid, and alkali metal salts of phosphoric acid, said salt being present in a sufficient amount that the initial pH of the reaction mixture is not less than 5.0, heating said mass to evaporate water therefrom until the temperature reaches between 120° C. and 140° C., and blowing air through said mass while maintaining the temperature between 120° C. and 180° C. until a resin of a higher softening point is obtained.

5. A process for the production of hydantoin-formaldehyde resins which comprises bringing together a hydantoin having the formula

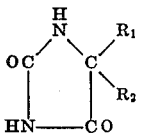

wherein $R_1$ and $R_2$ are taken from the class consisting of hydrogen, monovalent aliphatic, and cyclo aliphatic groups and formaldehyde in the presence of 0.1% to 2.0%, based on the weight of the hydantoin, of a buffer salt taken from the group consisting of alkali metal salts of unsubstituted aliphatic mono- and di-carboxylic acids containing not to exceed four carbon atoms, alkali metal salts of boric acid, and alkali metal salts of phosphoric acid, said salt being present in a sufficient amount that the initial pH of the reaction mixture is not less than 5.0, heating said mass to evaporate water therefrom until the temperature reaches between 120° C. and 140° C., and blowing air through said mass while maintaining the temperature between 120° C. and 180° C. until a resin of a higher softening point is obtained.

6. A process for the production of hydantoin-formaldehyde resins which comprises bringing together a hydantoin having the formula

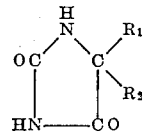

wherein $R_1$ and $R_2$ are taken from the class consisting of hydrogen, monovalent aliphatic, and cyclo aliphatic groups and formaldehyde in the proportion of 1.0 mole of hydantoin to 1.05–1.30 moles of formaldehyde in the presence of 0.1% to 2.0%, based on the weight of the hydantoin, of a buffer salt taken from the group consisting of alkali metal salts of unsubstituted aliphatic mono- and di-carboxylic acids containing not to exceed four carbon atoms, alkali metal salts of boric acid, and alkali metal salts of phosphoric acid, said salt being present in a sufficient amount that the initial pH of the reaction mixture is not less than 5.0, heating said mass to evaporate water therefrom until the temperature reaches between 120° C. and 140° C., and blowing air through said mass while maintaining the temperature between 120° C. and 180° C. until a resin of a higher softening point is obtained.

ALBERT F. CHADWICK.

REFERENCES CITED

The following references are of record in the file of this patent:

UNITED STATES PATENTS

| Number | Name | Date |
|---|---|---|
| 1,952,598 | Luther | Mar. 27, 1934 |
| 2,155,863 | Jacobson | Apr. 25, 1939 |
| 2,192,129 | Ellis | Feb. 27, 1940 |
| 2,313,953 | Loughborough | Mar. 16, 1943 |
| 2,338,464 | Smidth | Jan. 4, 1944 |
| 2,388,143 | Harris | Oct. 30, 1945 |
| 2,428,752 | Hewett | Oct. 7, 1947 |

FOREIGN PATENTS

| Number | Country | Date |
|---|---|---|
| 497,124 | Great Britain | Dec. 13, 1938 |
| 880,185 | France | Dec. 18, 1942 |